(12) United States Patent
Pei et al.

(10) Patent No.: US 12,148,048 B2
(45) Date of Patent: Nov. 19, 2024

(54) FRAMEWORK FOR TRANSACTION CATEGORIZATION PERSONALIZATION

(71) Applicant: Intuit Inc., Mountain View, CA (US)

(72) Inventors: Lei Pei, Sunnyvale, CA (US); Juan Liu, Cupertino, CA (US); Ruobing Lu, Mountain View, CA (US); Ying Sun, Foster City, CA (US); Heather Elizabeth Simpson, Sunnyvale, CA (US); Nhung Ho, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 141 days.

(21) Appl. No.: 17/218,079

(22) Filed: Mar. 30, 2021

(65) Prior Publication Data

US 2022/0318925 A1 Oct. 6, 2022

(51) Int. Cl.
*G06Q 40/12* (2023.01)
*G06N 5/04* (2023.01)
*G06N 20/00* (2019.01)
*G06N 3/084* (2023.01)

(52) U.S. Cl.
CPC ............ *G06Q 40/12* (2013.12); *G06N 5/04* (2013.01); *G06N 20/00* (2019.01); *G06N 3/084* (2013.01)

(58) Field of Classification Search
CPC .......... G06Q 40/12; G06N 5/04; G06N 20/00; G06N 3/084
See application file for complete search history.

(56) References Cited

U.S. PATENT DOCUMENTS

| | | | |
|---|---|---|---|
| 2016/0055427 A1* | 2/2016 | Adjaoute ........... | G06Q 30/0201 706/12 |
| 2021/0027300 A1* | 1/2021 | Chetia ................ | G06Q 20/4016 |
| 2021/0173916 A1* | 6/2021 | Ortiz .................... | G06V 10/764 |
| 2021/0233101 A1* | 7/2021 | Laserson ............... | G06N 20/00 |
| 2021/0406734 A1* | 12/2021 | Pont ........................ | G06N 3/08 |

OTHER PUBLICATIONS

Ning, Y., et al., "A Gradient-based Adaptice Learning Framework for Efficient Personal Recommendation", Aug. 27-31, 2017, 9 pages.
Chen, M. X., et al., "Gmail Smart Compose: Real-Time Assisted Writing", May 17, 2019, 9 pages.
Mazare, P., et al., "Training Millions of Personalized Dialogue Agents", Sep. 6, 2018, 5 pages.

* cited by examiner

*Primary Examiner* — Peter Ludwig
*Assistant Examiner* — Reva R Moore
(74) *Attorney, Agent, or Firm* — Lathrop GPM LLP

(57) ABSTRACT

A method utilizes a framework for transaction categorization personalization. A transaction record is received. a baseline model is selected from a plurality of machine learning models. An account identifier, corresponding to the transaction record using the baseline model, is selected. The account identifier for the transaction record is presented.

14 Claims, 13 Drawing Sheets

FRAMEWORK FOR TRANSACTION CATEGORIZATION PERSONALIZATION

CROSS REFERENCE TO RELATED APPLICATIONS

One or more embodiments includes subject matter related to U.S. patent application Ser. No. 17/217,907; U.S. patent application Ser. No. 17/162,365, U.S. patent application Ser. No. 17/187,660, each of which are incorporated herein by reference in its entirety.

BACKGROUND

Transaction categorization is often an important part of transaction processing. For example, a transaction may be categorized into an account included in a chart of accounts (COA). Automated transaction categorization methods enhance entity experience by reducing the need for tedious manual transaction review and categorization. Systems may allow entities to fully personalize their charts of accounts and assign different accounts to similar transactions.

Automated transaction categorization can be challenging with the different types of entities. For first-time entities (e.g., non-established entities), the system has limited past history from the entities on which to base recommendations. For entities that have some transactions categorized, a entity may categorize transactions in real-time during a session that is different from previous behavior thereby making prediction based on previous behavior difficult. Also, entities may create customized charts of accounts that are unique, which makes it challenging for systems to provide recommendations that include each of the customized accounts for automated transaction categorization. Established entities may have more customizations than new entities. A further challenge is handling each of these types of with a single system to prevent individual entities from having to experience these issues.

SUMMARY

In general, in one or more aspects, the disclosure relates to a method that utilizes a framework for transaction categorization personalization. A transaction record is received. a baseline model is selected from a plurality of machine learning models. An account identifier, corresponding to the transaction record using the baseline model, is selected. The account identifier for the transaction record is presented.

In general, in one or more aspects, the disclosure relates to a system that includes a server and a server application. The server includes one or more processors and one or more memories. The server application executes on one or more processors of the server. A transaction record is received. a baseline model is selected from a plurality of machine learning models. An account identifier, corresponding to the transaction record using the baseline model, is selected. The account identifier for the transaction record is presented.

A method trains and uses machine learning models of a framework for transaction categorization personalization. A baseline model, of a plurality of machine learning models, is trained. The baseline model is selected from the plurality of machine learning models. An account identifier, corresponding to a transaction record, is selected using the baseline model. The account identifier for the transaction record is presented.

Other aspects of the invention will be apparent from the following description and the appended claims.

BRIEF DESCRIPTION OF DRAWINGS

FIG. 3A, FIG. 3B, FIG. 3C, FIG. 4A, and FIG. 4B show examples in accordance with disclosed embodiments.

DETAILED DESCRIPTION

Figure 1A:
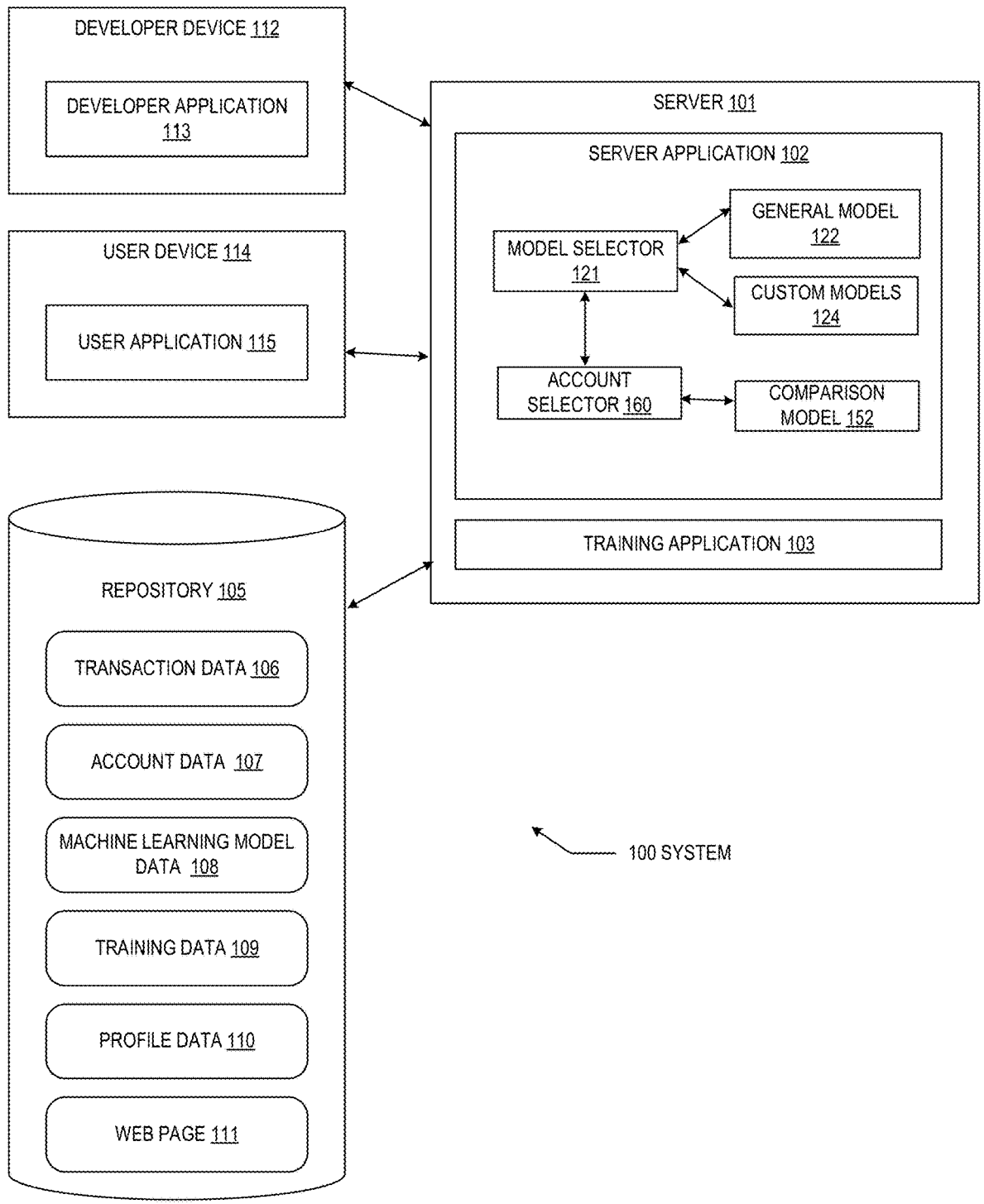
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments address a problem of handing various challenges of categorizing transactions, including first time entities, entities with some categorization, and entities who have a customized chart of accounts. To manage the various challenges, embodiments of the disclosure break down the problem of providing accurate transaction categorization recommendations into subproblems. Each of the subproblems uses tailored machine learning technologies to address the particular pain points of entities.

For new entities with no pre-existing data, users may stop using the system when the categorization accuracy is low. However, systems are challenged by not having much data upon which to base the categorization. One or more embodiments apply a deep learning framework that leverages populational data (data from a variety of entities) to make category recommendations. Further, a collection of binary classifications is performed to match transactions to accounts. By transforming a multiple class classification problem into a binary classification problem, the potential size of the classification is reduced.

For entities starting to use the system, the repetitive work of recategorization may cause users to stop using the system. For such entities, the system's in-session learning mechanism learns from entity actions quickly and generalizes to similar transactions. Through generalization, the system greatly reduces users' workload.

For more established entities with a rich personal history, the established entities accounting structure is often more complex. One or more embodiments involve a two-stage process. The first stage involves converting sparse raw features into a transaction vector with dense features. The second stage classifies the transaction into a customized chart of accounts using the dense features. The data of an entity is leveraged to provide personalized recommendations that include the custom accounts in the customized chart of accounts of the entity.

The machine learning models are integrated into a seamless entity experience. To the entity, the system just works and the entity may be unaware of the different machine learning models and technologies being used to address different pain points.

Figure 1B:
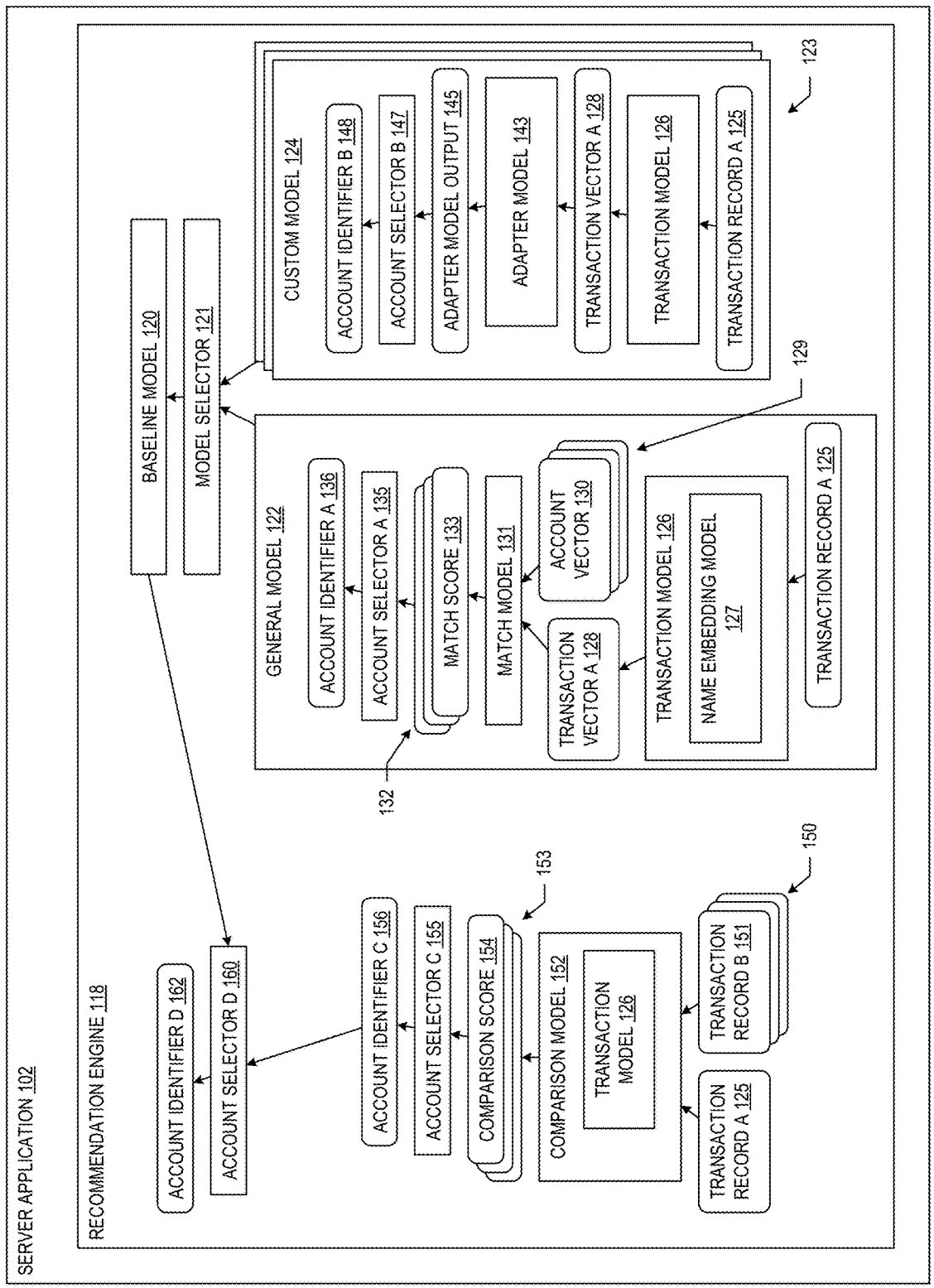
Figure 1C:
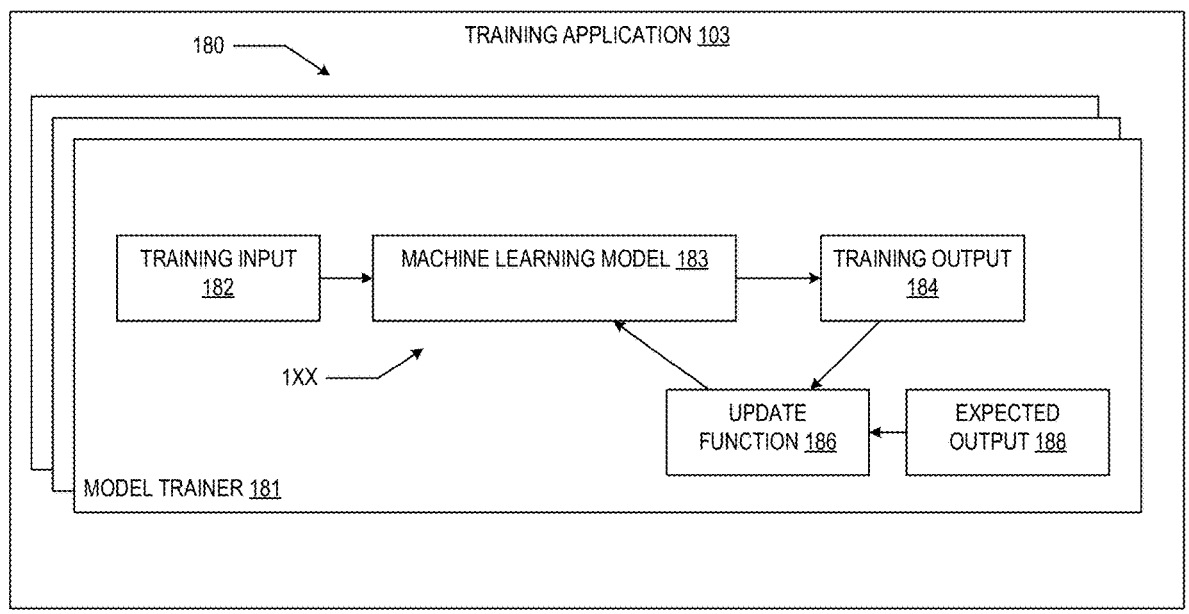

The Figures are organized as follows. FIGS. 1A, 1B, and 1C show diagrams of embodiments that are in accordance with the disclosure. FIG. 1B shows the server application (102), which uses machine learning models to categorize transaction records. FIG. 1C shows the training application (103), which trains machine learning models to categorize transaction records. The embodiments of FIGS. 1A, 1B, and 1C may be combined and may include or be included within the features and embodiments described in the other figures of the application. The features and elements of FIGS. 1A, 1B, and 1C are, individually and as a combination, improvements to the technology of machine learning. The various elements, systems, and components shown in FIGS. 1A, 1B, and 1C may be omitted, repeated, combined, and/or altered as shown from FIGS. 1A, 1B, and 1C. Accordingly, the scope of the present disclosure should not be considered limited to the specific arrangements shown in FIGS. 1A, 1B, and 1C.

FIGS. 2A, 2B, 2C, and 2D show flowcharts of processes in accordance with the disclosure. The process (200) of FIG. 2A uses machine learning models to generate a baseline account suggestion. The process (220) of FIG. 2B uses machine learning models to generate baseline account suggestions, generate comparison account suggestions, and choose among the baseline and comparison account suggestions. The process (250) of FIG. 2C trains and uses a general model of a baseline model. The process (280) of FIG. 2D train and uses a custom model of a baseline model. The embodiments of FIGS. 2A, 2B, 2C, and 2D may be combined and may include or be included within the features and embodiments described in the other figures of the application. The features of FIGS. 2A, 2B, 2C, and 2D are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 1A, the system (100) includes a user device (114), a repository (105), a developer device (112), and the server (101). The server (101) may include the server application (102), and the training application (103).

Figure 5A:
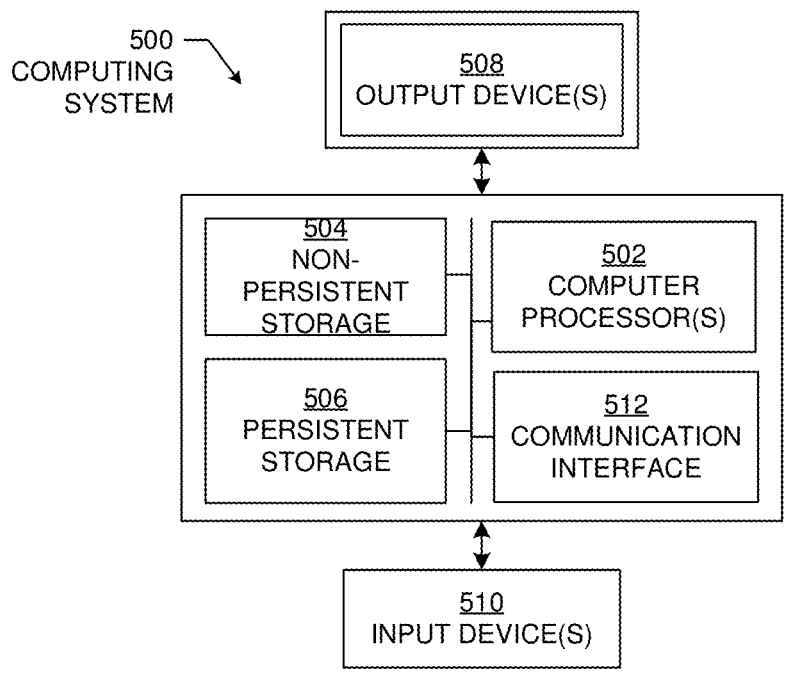
FIG. 5A and FIG. 5B show computing systems in accordance with disclosed embodiments.
Figure 5B:
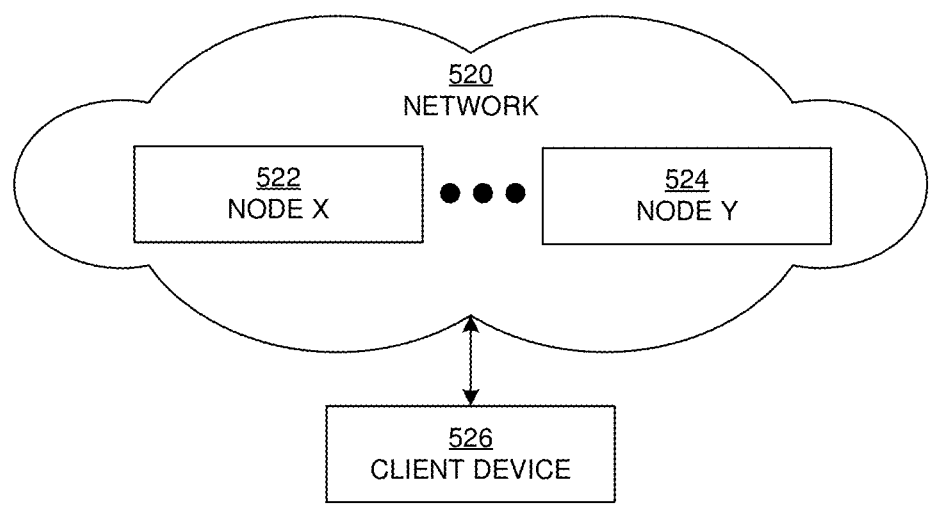

The user device (114) is an embodiment of the computing system (400) and the nodes (522 and 524) of FIG. 5A and FIG. 5B. In one embodiment, the user device (114) is a desktop personal computer (PC), a smartphone, a tablet, etc. that is used by a user. The user device (114) is used to access the web page (111) of the website hosted by the system (100). The user device (114) includes the user application (113) for accessing the server application (102). The user application (113) may be a browser, a local user level application, or another application. The user application (113) may include multiple interfaces (e.g., graphical user interfaces, application program interfaces (APIs)) for interacting with the server application (101). A user may operate the user application (115) to perform tasks with the server application (102) to interact with the system (100). The results may be presented by being displayed by the user device (114) in the user application (115).

For example, the user may access the system (100) to assign accounts (account identifiers) to transactions (transaction records) and receive suggestions (e.g., the account identifier D (162) of FIG. 1B) from the system (100) for which account to assign to a transaction (e.g., the transaction corresponding to the transaction record A (125) of FIG. 1B).

The user may be one of multiple users that have access to a computing system on behalf of an entity (e.g., family, business organization, nonprofit organization, etc.). For example, a business may have multiple users that access the system to review the accounts of the entity. An entity may be a person or a business that utilizes the system to track accounts. In the present disclosure, the user may refer to any user operating on behalf of the entity. For example, a first user may customize the chart of accounts for the entity and the second user may review the accounts/process transactions for the entity. In such scenario, the user accounts are the entity's accounts on which the user is performing actions. Each user may have user device (114) to access the server application (102).

The developer device (112) is an embodiment of the computing system (500) and the nodes (522 and 524) of FIG. 5A and FIG. 5B. In one embodiment, the developer device (114) is a desktop personal computer (PC). The developer device (112) includes the developer application (113) for accessing the training application (103). The developer application (113) may include a graphical user interface for interacting with the training application (103) to control training and updating the machine learning models of the system (100).

The developer application (113) and the user application (115) may be web browsers that access the server application (102) and the training application (103) using web pages hosted by the server (101). The developer application (113) and the user application (115) may additionally be web services that communicate with the server application (102) and the training application (103) using representational state transfer application programming interfaces (RESTful APIs). Although FIG. 1A shows a client server architecture, one or more parts of the training application (103) and the server application (102) may be local applications on the developer device (112) and the user device (114) without departing from the scope of the disclosure.

The repository (105) is any type of storage mechanism or device that includes functionality to store data. The repository may include one or more hardware devices (e.g., storage servers, file systems, database servers, etc.) computing system that may include multiple computing devices in accordance with the computing system (500) and the nodes (522 and 524) described below in FIGS. 5A and 5B. The repository (105) may be hosted by a cloud services provider (e.g., that provides hosting, virtualization, and data storage services as well as other cloud services to operate and control the data, programs, and applications that store and retrieve data from the repository (105)). The data in the repository (105) may include the transaction data (106), the account data (107), the machine learning model data (108), and the training data (109).

The transaction data (106) is data for multiple transactions of multiple entities of the system (100). In one or more embodiments, a transaction is a financial transaction between the entity and at least one other party to the transaction. For example, the financial transaction may be between a customer of the entity and the entity. As another example, the transaction may be between a vendor of the entity and the entity. The transaction may be a commercial transaction involving the sale of one or more products (e.g., goods and/or services).

Transactions are stored as transaction records. A transaction record includes data describing a transaction. A transaction record is a text string describing a financial transaction. In one embodiment, a transaction record is for a commercial transaction and includes a name of an opposing party to the transaction, an amount of the transaction, a date of the transaction (which may include a time), and a description of the transaction. The opposing party to the transaction (i.e., opposing party) is at least one other party with which the entity performs the transaction. As such, the opposing party may be the payor or payee depending on whether the transaction is an income (i.e., involves payment to the entity) or an expense (i.e., involves the entity making payment). The description may include the name of the opposing party.

The account data (107) is data for the accounts of the multiple entities that use the system (100). An account may be a bookkeeping account that tracks credits and debits for a corresponding entity. Each entity may have a chart of accounts. The term, chart of accounts, corresponds to the standard definition used in the art to refer to the financial accounts in the general ledger of an entity. The chart of accounts is a listing of accounts that are used by the entity. Different accounts may have different tax implications and accounting implications.

For at least some entities, the chart of accounts is customized. Namely, one or more of the accounts in the chart of accounts may have different names and/or types of transactions than used by other entities. The entity may generate a new name for the account and/or define, directly or indirectly, the particular types of transactions for the account. Each account has a corresponding unique account identifier. An account identifier is a value that uniquely identifies one of a number of accounts.

In the repository (106), the account data (108) may include the charts of accounts for the entities and the account identifiers that identify the different accounts for an entity. Additionally, each account may have a precomputed account vector mapped to the account, which identifies the account. As an example, the names of the accounts may include "Reimbursable Expenses", "Advertising and Marketing", "Utilities", "Sales", "Accounts Payable", "Accounts Receivable", "Mortgages", "Loans", "Property, Plant, and Equipment (PP&E)", "Common Stock", "Services, "Wages and Payroll", etc. Each transaction may be assigned to one or more of the accounts in order to categorize the transactions. Assignment of an account to a transaction may be performed by linking an account identifier of an account to a transaction record of a transaction.

Continuing with the repository, the machine learning model data (108) may include the code and data that form the machine learning models used by the system. For example, the weights of the neural networks and regression models may be part of the machine learning model data (108).

The training data (109) is the data used to train the machine learning models of the system (100). The training data (109) has pairs of transaction records (e.g., historical transaction records of the entities using the system) and account identifiers that had been assigned to the transaction. The training data (110) may also include the intermediate data generated to train and update the machine learning models of the system. The training data (110) may include the training inputs and expected outputs shown in FIG. 1C. Each model used by the system (100) may have a particular set of data in the training data (109) that includes the specific type of input data for the model and the specific type of expected output for the model. The training data (109) may include the training inputs and expected outputs shown in FIG. 1C.

The profile data (110) is the data used to track the entities and entities of the system (100). The profile data (110) may identify when an entity started using the system, identify the chart of accounts for an entity, identify the entities that may access the information for an entity, etc. In one embodiment, the profile data (110) may be used to determine how long an entity has been using the system (100), which may then be used to determine whether the baseline model (120) (of FIG. 1B) will use the general model (122) (of FIG. 1B) or one of the custom models (123) (of FIG. 1B).

The data in the repository (106) may also include a web page (111) that is part of a website hosted by the system (100). The users and the developers may interact with the website using the user device (114) and the developer device (112) to access the server application (102) and the training application (103).

Continuing with FIG. 1A, a server (101) is operatively connected to the developer device (112), user device (114), and repository (105). The server (101) is a computing system and/or nodes, such as the computing system and nodes shown in FIGS. 5A and 5B. For example, the server (101) may be one of a set of virtual machines hosted by a cloud services provider to deploy the training application (103) and the server application (102). Each of the programs running on the server (101) may execute inside one or more containers hosted by the server (101). Although shown as individual components, the server (101) and repository (105) may be the same device or collection of devices. The server (101) includes functionality to execute a server application (102).

The server application (102) includes a general model (122), custom models (124), and a comparison model (152). The general model (122) are, directly or indirectly, communicatively connected to a model selector (121). The model selector (121) and comparison model (152) are, directly or indirectly, communicatively connected to an account selector (160). Each of the components of the server application (102) are discussed below.

A general model (122) is a machine learning model for non-established entities. In one or more embodiments, the general model is a twin tower model. The general model (122) includes a transaction model that generates a transaction vector from a record of the transaction to be categorized. The general model (122) also includes an account embedding model that generates an account vector from an account name. The transaction vector and the account vector are compared with a match model to determine if the transaction of the transaction vector should be categorized to the account of the account vector. The transaction model and the account embedding model are trained with data from multiple entities so that the models can still provide relevant recommendations for entities that lack an extensive history with the system.

The custom models (124) handle making recommendations for a customized chart of accounts. The custom models handle the number of different possible accounts that entities have. The custom model (124) includes the transaction model and an adapter model. The transaction model generates a transaction vector from a transaction. The transaction vector is input to an adapter model. In one embodiment, the adapter model includes a distinct logistic regression model for each account of the chart of accounts of an entity. For each logistic regression model, the logistic regression model receives the transaction vector as an input and outputs a value that indicates if the account that corresponds to the logistic regression model, should be used to categorize the transaction. Other types of machine learning models may be used for the adapter model.

A comparison model (152) may be used for in-session recommendations. The comparison model (152) may be a Siamese network model. The comparison model (152) may be used during an entity session to compare the current transaction (i.e., a transaction that an entity is currently categorizing) to a previous transaction (i.e., a transaction that the entity has already categorized), and determine the similarity between the two transactions. When the current transaction and the previously categorized transaction have a high enough comparison score, the system uses the recommendation from the comparison model (152). The recommendation from the comparison model (152) is a recommendation to use the account assigned to the previously categorized transaction.

The model selector (121) identifies which machine learning model is to be used as a baseline model (e.g., between the general model (122) or the custom models (124)). The account selector (160) is configured to select the account from the output of the comparison model (152) and baseline model as selected by the model selector (121).

The training application (103) is a program on the server (101). The training application (103) trains the machine learning models as further described in FIG. 1C. The training application (103) may be operated or controlled by the developer device (112) with a developer application (113).

Figure 2A:
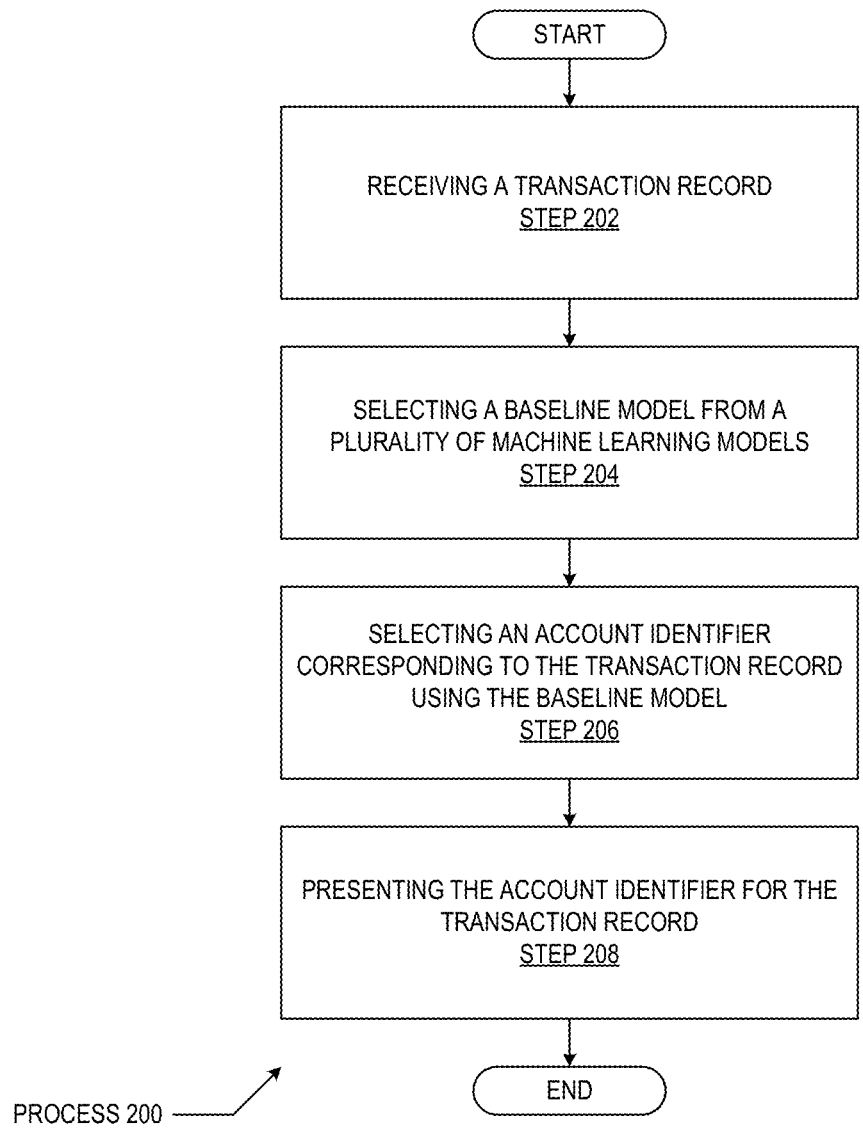
FIG. 2A, FIG. 2B, FIG. 2C, and FIG. 2D show flowcharts in accordance with disclosed embodiments.

Turning to FIG. 2A, at Step 202, a transaction record is received. The transaction record may be received by a server application response to an entity logging into the system and requesting to see a list of transactions. The list of transactions may include the transaction record, which may be displayed by the entity device accessing the system.

At Step 204, a baseline model is selected from a group of machine learning models. In one embodiment, the baseline model is selected in accordance with one or more thresholds. The baseline model may be selected as a general model when one or more entity usage thresholds have not been met. The entity usage thresholds may identify a minimum period of time since the creation of the entity profile for the entity, a minimum number of transactions stored by the system for the entity, a minimum number of accounts for the entity, etc. For example, when the date (and time) between the current date and the date the entity profile was created is less than a threshold period of time (e.g., 7 days), then the general model may be used. Otherwise a custom model may be selected to be used as the baseline model. The selection may be performed by the model selector.

Concurrently with selecting and executing the baseline model, the comparison model may execute. The comparison model is used to perform in-session recommendations. In other words, the comparison model continually trains and learns associations between accounts and transactions while the user is using the server application.

At Step 206, an account identifier corresponding to the transaction record is selected using the baseline model. The account identifier that is selected identifies the account that is suggested to be assigned to the transaction of the transaction record.

At Step 208, the account identifier for the transaction record is presented. The account identifier may be presented by transmitting the account identifier from a server to an entity device. After receiving the account identifier, the entity device may display the account identifier with the transaction record in an entity application.

FIG. 1B shows a more detailed system diagram for performing the operations of FIG. 2A in accordance with one or more embodiments. Briefly, the machine learning models of embodiments of the disclosure may use neural networks. Neural networks may operate using forward propagation and backpropagation. Forward propagation may include multiplying inputs to a layer of a neural network by a set of weights and summing the result to generate an output. Backpropagation is the backward propagation of error through the layers of a neural network to update the weights of the layers. The weights may be updated in response to error signals generated from the outputs of the layer. Each of the layers of the machine learning models may include multiple layers and form part of a neural network. The layers of the neural networks may include one or more fully connected layers, convolutional neural network (CNN) layers, recurrent neural network (RNN) layers, etc. Machine learning models other than neural networks may also be used in embodiments of the disclosure.

Turning to FIG. 1B, the server application (102) is a set of programs running on the server (101) (of FIG. 1A). The server application (102) implements a framework for transaction categorization personalization. The server application (102) uses the recommendation engine (118) to generate a recommendation of an account (identified with the account identifier D (162)) to which the transaction record A (125) may be assigned.

The recommendation engine (118) is a component of the server application (102). The recommendation engine (118) uses multiple machine learning models to select the account identifier D (162), which identifies one of a set of multiple accounts to which a transaction record A (125) may be assigned. The recommendation engine (118) includes the baseline model (120) and the comparison model (152).

The baseline model (120) is a machine learning model and is either the general model (122) or one of the custom models (123). The baseline model (120) is selected with the model selector (121). The baseline model (120), through the general model (122) or the custom models (123), classifies input data and selects an account from multiple accounts. The input to the baseline model (120), i.e., the input to either the general model (122) or the custom models (123), is a transaction record (e.g., the transaction record A (125)) and the output is an account identifier (e.g., one of the account identifiers A (136) and B (148)) that may be suggested by the system (100) for assignment to the transaction corresponding to the transaction record input to the baseline model (120).

The model selector (121) identifies which machine learning model is to be used as the baseline model (120). The model selector (121) selects the baseline model (120) from a group comprising the general model (122) and the custom models (123). The model selector may use one or more thresholds based on different criteria to identify which machine learning model to use as the baseline model (120). For non-established entities, the general model (122) may be used and, for established entities, the custom models (123) may be generated and used. For example, with a non-established entity, the general model (122) may be used for the first 7 days that an entity accesses the system (100) (of FIG. 1A) for the non-established entity. After the first 7 days, the non-established entity may become an established entity and the custom model (124) may be generated and then used to provide account recommendations for the transaction records of the established entity.

Several thresholds may be used in order to select which machine learning model to use as the baseline model (120). For example, the thresholds may include a threshold length of time (e.g., compared against the length of time that an entity has been set up with the system (100) (of FIG. 1A)), a threshold amount of transaction records (e.g., greater than (1000) transaction records), a threshold number of accounts (e.g., greater than 20 accounts used, greater than 5 personalized accounts used), etc.

The general model (122) is a machine learning model that identifies the account identifier A (136) as corresponding to the transaction record A (125). An example of a general model including components and execution thereof is described in U.S. patent application Ser. No. 17/217,907, which is incorporated herein by reference in its entirety. The transaction record A (125) is input to the transaction model (126), which includes the name embedding model (127).

The name embedding model (127) generates a name embedding vector from a string value. The name embedding model (127) may use a neural network. In one embodiment, the string value is the payee name from a transaction record. The name embedding model (127) may be trained using a word2vec algorithm that predicts words that are near other words in a sentence. A "sentence" that is used to train the name embedding model (127) may be a collection of names of payees for transaction records that have been assigned to similar accounts.

The transaction model (126) is a machine learning model that may include multiple neural network layers and inputs that generate the transaction vector A (128) from features extracted from the transaction record A (125). The features extracted from the transaction record A (125) may include the raw features from the different fields of the transaction record A (125) and values derived from the raw features. The transaction model (126) takes the transaction information as input and encodes the transaction information with a pre-trained encoder. The pre-trained encoder is trained with a regression model. The output of the transaction model is a transaction vector.

The transaction vector A (128) is input to the match model (131) with the account vector (130). The account vector (130) is one of the account vectors (129) that correspond to the accounts of a chart of accounts for an entity set up within the system (100) (of FIG. 1A). The account vectors (129) may be pre calculated with an account embedding model. The account embedding model may be an encoder that receives an account name as an input and outputs the account vector (130). The account vectors (130) are generated by account embedding model. The account embedding model encodes the account information to generate an account vector. The account embedding model is a pre-trained word to vector model that converts an account name to an account vector, which is the output of the account embedding model. For example, the account embedding model may be a word2vec model. Alternative models include GloVe developed by Stanford, fastText developed by Facebook, Inc., amongst other encoding models.

The transaction model (126) and the account embedding model are in the same vector space. As such, the account vectors (129) and the transaction vector A (128) have the same dimensions and are in the same vector space. Being in the same vector space, transaction vectors (output from the transaction model (128)) and account vectors (output from the account embedding model) that are the same or similar in value will identify the same accounts while transaction vectors and account vectors that have different values will identify different accounts. In one embodiment, the transaction model (126) may be trained independently of other models and an account vector may be used as the training output for training the transaction model (126). Thus, directly using the vector space and values of the account vectors may be performed to train the transaction model (132) to generate transaction vectors with similar values.

The similarity between the transaction vector A (128) and the account vectors (129) (including the account vector (130)) is determined using the match model (131). The match model (131) may be a machine learning model, which may be a neural network. The match model (131) receives the transaction vector A (128) and the account vector (130) as an input to generate the match score (133) as an output. A match model (152) combines the outputs from the transaction model (132) and account embedding model (144). The match model (152) may have multiple multilayer perceptron (MLP) layers to combine the transaction vector and the account vector to form a match score that indicates whether the transaction vector (generated from transaction information) matches the account vector (generated from account information). Using the match model (152) instead of simply using the cosine similarity between the outputs of the transaction model (132) and the account embedding model (144) of the improves the accuracy of the system (100). The transaction vector A (128) is matched against each of the account vectors (129) to generate the multiple match scores (132) using the match model (131). In one embodiment, the match score (133) is a scalar value between 0 and 1 with higher values indicating a closer match between the input vectors (e.g., the transaction vector A (128) and the account vector (130)).

The account selector A (135) selects the account identifier A (136) using the match scores (132). The account selector A (135) may identify the match score (133) as having the highest value from the match scores (132) and identify the account identifier A (136) for the account that corresponds to the match score (133).

The custom models (123) (including the custom model (124)) are machine learning models that are generated and trained for the entities set up with the system (100) (of FIG. 1A). For example, the custom model (124) corresponds to one of the entities and may be generated and trained after a chart of accounts has been developed for the entity. The custom models (123) are used for established entities that use an application. Established entities are entities that have used an application for a period of time such that the established entities have a customized chart of accounts.

Established entities often have complex charts of accounts, which may contain multiple accounts that do not match with the accounts of other entities. Thus, to accommodate the level of customization, standard machine learning categorization techniques may be insufficient because such techniques rely on having significant training data (i.e., enough transactions that are known correctly categorized in the customized chart of accounts). With a customized chart of accounts only for a single entity, the number of transactions that are known to be correctly categorized is insufficient.

Stated another way, for a particular entity, limited training data is available compared to the amount of data required to train a machine learning model. Training the machine learning model involves adjusting parameters of the model using training samples (i.e., pre-categorized transaction records). In the case of a single entity with a customized chart of accounts, the number of parameters of the model may be significantly greater than the training samples. Because of this imbalance, a single machine learning model that categorizes transactions into accounts cannot be trained with just the entity's data.

One or more embodiments are directed to a two-stage solution to this problem. The first stage includes a transaction model that encodes transaction records into a transaction vector. Because transaction records are standardized (e.g., have the same type of data regardless of the entity), the first stage is a general model (i.e., transaction model (126)) that may be used across multiple entities. The second stage includes an adapter model (143). The adapter model (143) is customized to the particular entity and the particular entity's chart of accounts. The adapter model (143) uses, as input, the transaction vector and generates, as output, an account in the customized chart of accounts. The two-stage solution addresses the problem because the first stage, which can be trained using training data from a variety of entities, reduces the number of features needed to be considered by the second stage. By reducing the number of features, the second stage can be trained for the particular entity using the limited training data that is available for that particular entity. One or more embodiments may include additional stages without departing from the scope of the disclosure.

An example of a custom model including components and execution thereof is described in U.S. patent application Ser. No. 17/187,660, which is incorporated herein by reference in its entirety. The custom model (124) is a machine learning model that identifies the account identifier B (148) as corresponding to the transaction record A (125). The account identifier B (148) identified with the custom model (124) may be different from the account identifier A (136) identified with the general model (122) even though the same input, the transaction record A (125), is used for both models.

The transaction record A (125) is input to the transaction model (126), which is also used by the general model (122) and the comparison model (152). The transaction vector A (128) is output from the transaction model (126). The transaction vector A (128) is input to the adapter model (143).

The adapter model (143) generates the adapter model output (145) from the transaction vector A (128), which may be used instead of the raw data from the transaction record A (125). The raw data that forms transaction records (e.g., the payee name, amount, date description, etc.) may be too sparse and have too few examples to properly train the machine learning models that are in the adapter model (143).

In one embodiment, the adapter model (143) may include multiple logistic regression models that are mapped to the accounts of a chart of accounts for an entity of the system (100) (of FIG. 1A). The logistic regression models may be mapped to the accounts (and corresponding account identifiers) in a one to one correspondence. Each entity may have a set of logistic regression models. The logistic regression models generate logistic regression model outputs. For a particular entity, each logistic regression model may be in a one to one correspondence with the accounts in the customized chart of accounts. Each of the logistic regression models receives the transaction vector from the first stage as an input and outputs a value. The output value from one of the logistic regression models (a first logistic regression model) identifies whether the transaction record (from which the transaction vector was generated) should be categorized with the corresponding account that corresponds to the logistic regression model.

For a particular account, the logistic regression model operates as standard but using features in the transaction vector as the features of the model. Namely, features are weighted by corresponding weights and then mathematically combined to generate the logistic regression model output, whereby the weights are learned through the training of the model. In one or more embodiments, the logistic regression model output is a value between 0 and 1 whereby the lower the value, the less likely that the transaction matches the corresponding account. The adapter model output (145) may include each of the logistic regression model outputs and be formed as a vector.

In one embodiment, the adapter model (143) may be a neural network. The neural network may include customized layers and outputs that are specific to the chart of accounts of an entity. Each entity may have a customized neural network.

The account selector B (147) selects the account identifier B (148) from a group of account identifiers using the adapter model output (145). In one embodiment, each adapter model output (145) is a vector of the likelihood that the entity associates a transaction record (125) with each of the accounts in a chart of accounts.

The account selector B (147) may use a criterion to select the account identifier B (148) using the adapter model output (145). For example, the criterion may be to select the element in adapter model output (145) with the highest likelihood value and use the mapping between the elements of adapter model output (145) and the accounts to identify the account linked to the account identifier B (148).

The comparison model (152) is a machine learning model that generates the comparison scores (153) from the transaction record A (125) and the transaction records B (150). The comparison scores are measures of similarity between the unreviewed transaction record and the reviewed transaction records. Each reviewed transaction vector corresponds to a reviewed transaction record having a user-approved account identifier. The comparison model is a few-shot learning model that efficiently performs comparisons without classifying the comparison model's inputs. Leveraging the comparison model transforms the transaction categorization from a classification problem to a comparison problem. To reduce the $O(N^2)$ computational complexity of the training of the comparison model using transaction pairs, one or more embodiments leverage a baseline classifier to suppress the pairing of drastically different transactions. This makes the training of the comparison model more efficient. The comparison scores (153) correspond to the accounts that the transaction records B (151) are assigned. The transaction records B (150) are transaction records that have previously been assigned to an account. To generate the comparison score (154), of the comparison scores (153), the comparison model (152) uses the transaction record A (125) and the transaction record B (151), of the transaction records B (150). The comparison score (154) may be a scalar value between zero and one that identifies the similarity between the transaction record A (125) and the transaction record B (151) that are used to generate the comparison score (154). An example of a comparison model including components and execution thereof is described in U.S. patent application Ser. No. 17/162,365, which is incorporated herein by reference in its entirety.

In one embodiment, the comparison model (152) is a neural network and may be a Siamese neural network. The comparison model (152) may use the transaction model (126) to generate a first transaction vector from the transaction record A (125) and then use the transaction model (126) again to generate a second transaction vector from the transaction record B (151). The first and second transaction vectors may then be compared with additional layers of the neural network to determine the similarity between the transaction record A (125) and the transaction record B (151).

Stated another way, the comparison scores may be used to select a set of transactions whose corresponding vectors are close enough to that of the unreviewed transaction. This set of transactions are considered to be the neighborhood of the unreviewed transaction. The model then makes recommendations as follows: the model either recommends the account identifier from the baseline account classifier, or it derives a recommendation from the neighborhood from the comparison model, depending on whether the neighborhood's comparison score exceeds a threshold. Newly reviewed transaction records become immediately available for comparison with subsequently unreviewed transaction records enabling in-session learning in near real time.

The account selector C (155) selects the account identifier C (156) using the comparison scores (153). In one embodiment, the account selector C (155) identifies the account that corresponds to the comparison score with the highest value, which may be the comparison score (154).

The account selector D (160) selects the account identifier D (162) from the account identifiers from the comparison model (152) and the baseline model (120). The comparison model (152) identifies the account identifier C (156). The baseline model (120) identifies a baseline identifier, which is one of the account identifier A (136) from the general model (122) or the account identifier B (148) from custom model (124), in accordance with the selection by the model selector (121) as to which one of the general model (122) or the custom model (124) is selected as the baseline model (120). The account identifier D (162) corresponds to an account that is recommended to be assigned to the transaction record A (125).

As shown in FIG. 1B, the transaction record A (125) is received and the account identifier D (162) is identified as a suggestion for assigning the account of the account identifier D (162) to the transaction of transaction record A (125). To identify the account identifier D (162), the recommendation engine (118) selects one of the general model (122) and the custom model (124) to be used as the baseline model (120).

When the general model (122) is selected, the transaction record A (125) is input to the general model (122), which uses the transaction model (126), the match model (131), and the account selector A (135) to generate the account identifier A (136). The account identifier A (136) is then used as the baseline identifier for the baseline model (120).

When the custom model (124) is selected by the model selector (121), the transaction record A (125) is input to the custom model (124), which generates the account identifier B (148) using the transaction model (126), the adapter model (143), and the account selector B (147). The account identifier B (148) is then used as the baseline identifier for the baseline model (120).

The transaction record A (125) is also input to the comparison model (152). The comparison model (152) is used to generate the comparison scores (153) from the transaction record A (125) and the transaction records B (150). For example, the comparison model (152) may receive the transaction record A (125) and the transaction record B (151) as inputs and output the comparison score (154). The account selector C (155) receives the comparison scores (153) to generate the account identifier C (156). The account identifier C (156) may correspond to the account that is linked to the comparison score (154) having the highest value of the comparison scores (153).

After identifying the baseline identifier and the account identifier C (156), the account selector D (160) determines which of the account identifier C (156) and the baseline identifier will be used as the account identifier D (162). In one embodiment, the account identifier C (156) is used when the comparison score of the account identifier C (156) satisfies a threshold. For example, the threshold may be satisfied when the account identifier C (156) has a comparison score greater than a numerical value (e.g., 0.9).

Turning to FIG. 1C, the training application (103) trains the machine learning models (including the machine learning model (183)) used by the system (100) (shown in FIG. 1A). The machine learning models include (from FIG. 1B) the baseline model (120), the general model (122), the custom models (123) (including the custom model (124)), the transaction model (126), the name embedding model (127), the match model (131), the adapter model (143), and the comparison model (152).

Each machine learning model may be trained independently of the other machine learning models or may be trained in conjunction with the other machine learning models. For example, the transaction model (126) may be trained independently of each of the other models and the transaction model (126) may be trained in conjunction with the comparison model (152).

When a machine learning model is trained in conjunction with another machine learning model, both machine learning models may be updated based on the error between the expected output and the training output generated by the models. For example, when the transaction model (126) is trained in conjunction with the comparison model (152), error from the comparison model (152) may be fed back into the transaction model (126) to update the parameters of the transaction model (126).

The model trainer (181) is one of multiple model trainers (180), which are components that may operate as part of the training application (103). The model trainers (180) are used to train the machine learning models of the system (100) (of FIG. 1A). The model trainer (181) trains the machine learning model (183) (which may be one of the base line model (120), the general model (122), the custom models (123), the transaction model (126), the name embedding model (127), the match model (131), the adapter model (143), and the comparison model (152)).

The machine learning model (183) takes the training input (182), generates the training output (184) from the training input (182), uses the update function (186) to compare the training output (184) to the expected output (188), and updates the machine learning model (183). The updates may be in accordance with or proportional to the errors observed between the training output (184) and the expected output (188) by the update function (186). The machine learning model (183) and the update function (186) may be stored in the machine learning model data (108) (of FIG. 1A) of the repository (105) (of FIG. 1A). The training input (182), the training output (184), and the expected output (188) may be stored in the training data (109) (of FIG. 1A).

In one embodiment, the machine learning model (183) includes a neural network model that uses forward propagation to generate the training output (184) from the training input (182). The update function (186) uses backpropagation to update the weights of the neural network of the machine learning model (183) based on the error between the training output (184) and the expected output (188).

Figure 2B:
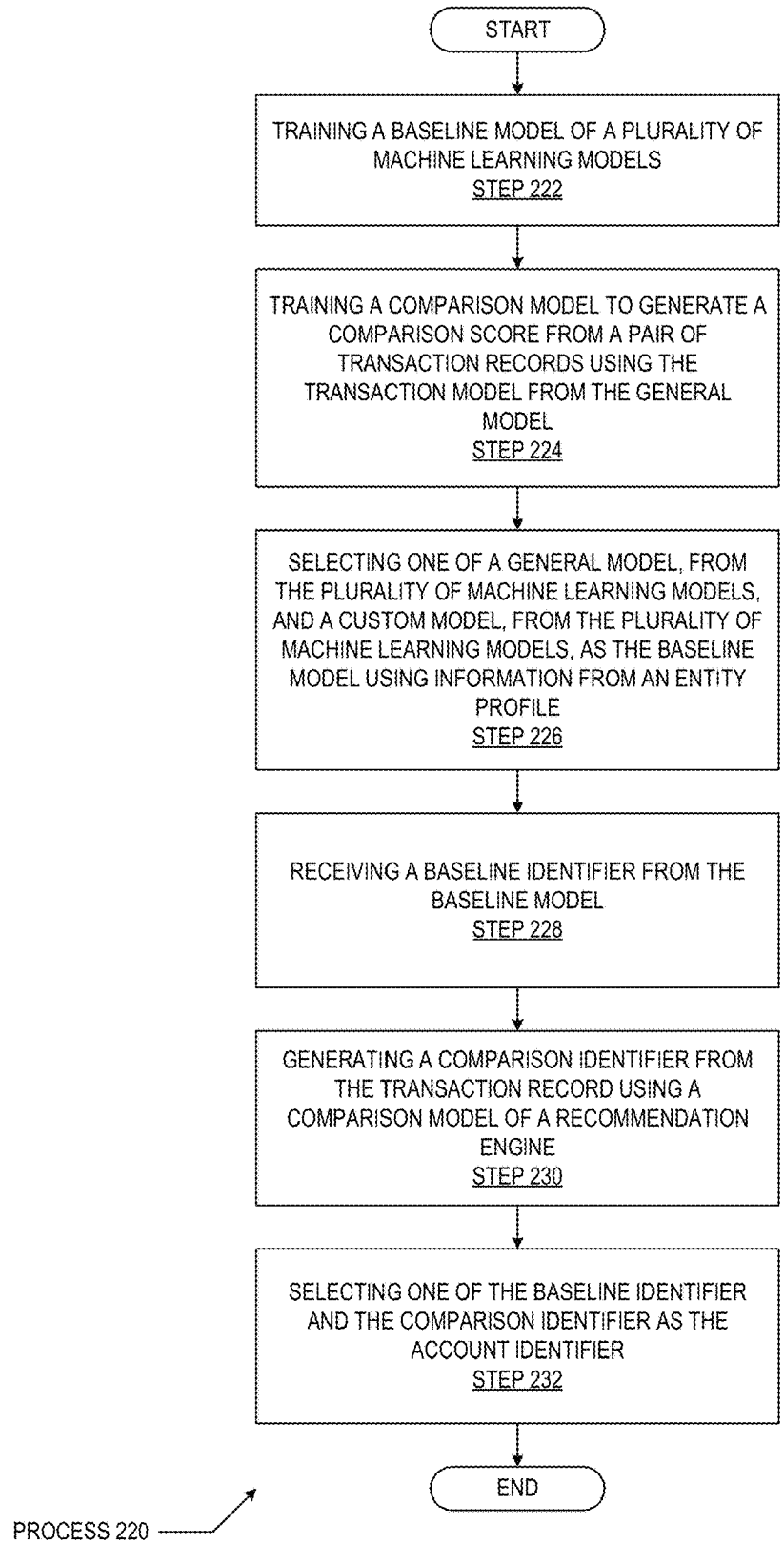

Turning to FIG. 2B, at Step 222, a baseline model, of a group of machine learning models, is trained. The baseline model may be one of a general model and a custom model. The baseline model is trained to generate an account identifier as an output from a transaction record as an input. In one embodiment, the baseline model is a neural network that is trained using backpropagation. The general model may include a match model, and a transaction model. The transaction model may include a name embedding model. The custom model may include the transaction model and an adapter model. Each of the models within the general model or within the custom model may be trained independently or in conjunction with each other.

At Step 224, a comparison model is trained to generate a comparison score from a pair of transaction records using the transaction model from the general model. In one embodiment, the baseline model is a neural network that is trained using backpropagation. A comparison model may include the transaction model. Each of the models within the comparison model may be trained independently or in conjunction with each other. For example, the transaction model within the comparison model may be trained as part of the baseline model (i.e., the general model or one of the custom models) used by the system so that training the comparison model may improve the accuracy of the baseline model.

At Step 226, one of a general model, from the group of machine learning models, and a custom model, from the group of machine learning models, is selected as the baseline model using information from an entity profile. Information from an entity profile may be compared against one or more of the thresholds (e.g., a minimum period of time since the creation of the entity profile for an entity, a minimum number of transactions stored by the system for the entity, a minimum number of accounts for the entity, etc.) to perform the selection. For example, when an entity profile is created less than a threshold number of days prior to the present day (e.g., less than 7 days ago), the general model may be used, and otherwise a custom model may be used.

At Step 228, a baseline identifier is received from the baseline model. The baseline identifier is an account identifier that is generated with either the general model or the custom model, which was previously selected. The general model and the custom model may each use the transaction model to generate the baseline identifier from a transaction record.

At Step 230, a comparison identifier is generated from the transaction record using a comparison model of a recommendation engine. The comparison identifier is an account identifier that is generated with the comparison model. The comparison model may use the transaction model to generate the comparison identifier.

At Step 232, one of the baseline identifier and the comparison identifier is selected as the account identifier. In one embodiment, the comparison identifier may be selected when the comparison score corresponding to the comparison identifier is greater than or equal to a threshold. Otherwise, the baseline identifier may be used.

Figure 2C:
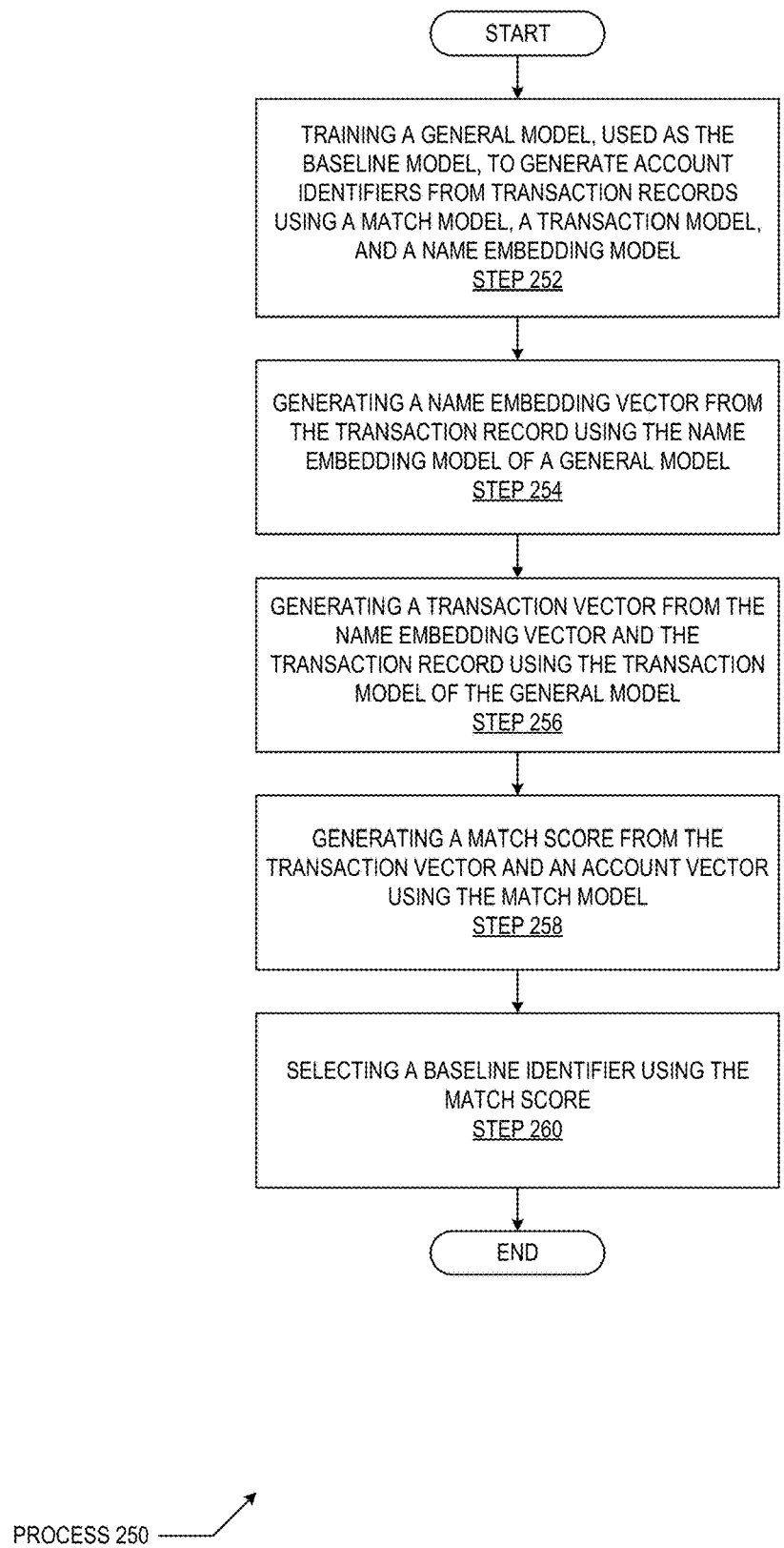

Turning to FIG. 2C, at Step 252, a general model, which may be used as the baseline model, is trained to generate account identifiers from transaction records. The general model uses a match model, a transaction model, and a name embedding model to generate the account identifiers.

At Step 254, a name embedding vector is generated from the transaction record using the name embedding model of a general model. The name embedding vector may be generated from a string that includes the name of a payee that is extracted from the transaction record. The payee name string may be converted to a word vector and then input to the name embedding model.

At Step 256, a transaction vector is generated from the name embedding vector and the transaction record using the transaction model of the general model. Additional features may be extracted from the transaction record that are inputs to the transaction model with the name embedding vector. For example, a value of the transaction and a date of the transaction may be extracted from the transaction record, which are input to the transaction model.

At Step 258, a match score is generated from the transaction vector and an account vector using the match model. The account vector may be one of multiple count vectors for the accounts of a chart of accounts of an entity. A match score may be generated for each account vector to identify the account to which the transaction record may be assigned. The accounts may be a set of default accounts with default names for new entities.

At Step 260, a baseline identifier is selected using the match score. The baseline identifier is selected with an account selector of the general model and used as the baseline identifier by the system. The baseline identifier may be an account identifier that identifies the account that corresponds to the match score having the highest value.

Figure 2D:
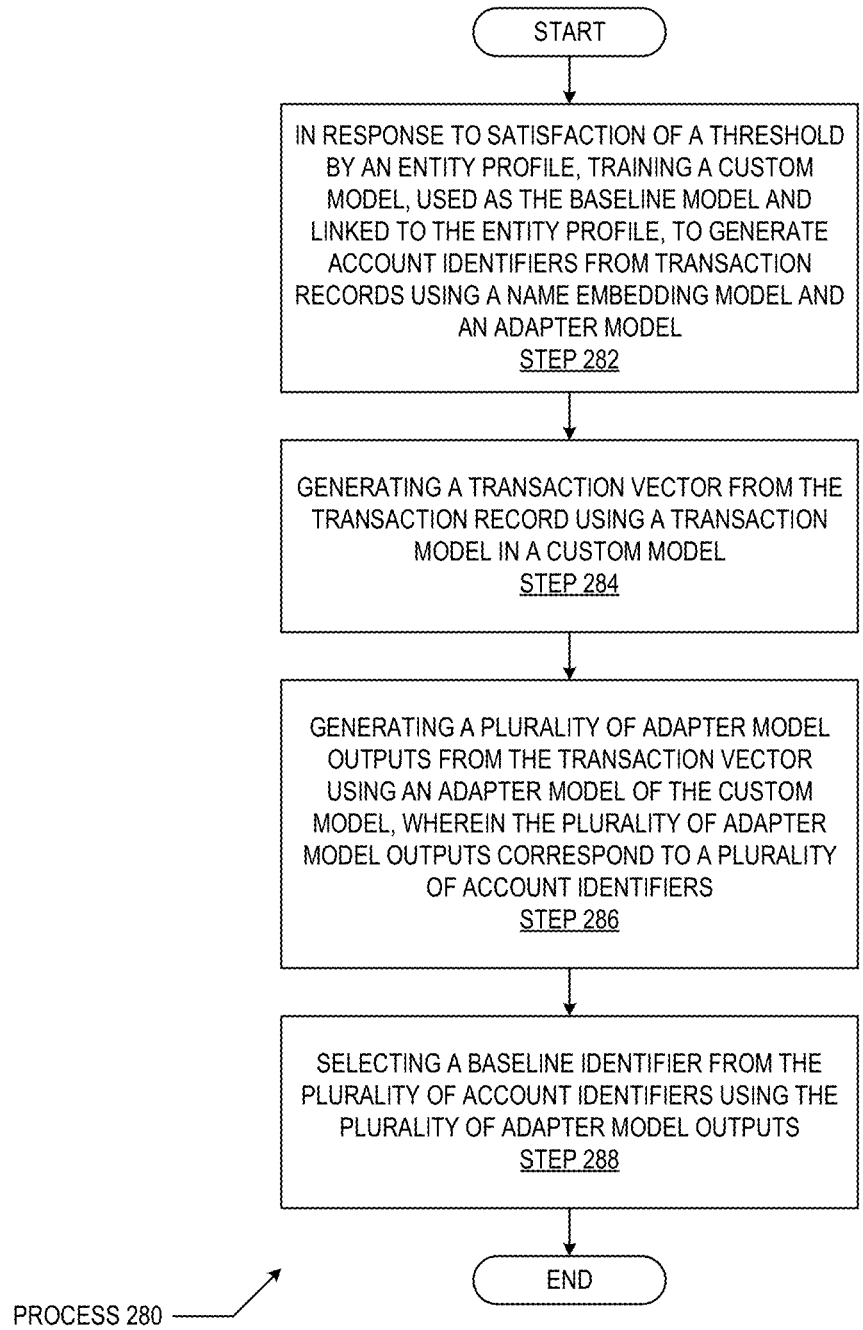

Turning to FIG. 2D, at Step 282, in response to satisfaction of a threshold by an entity profile, a custom model, used as the baseline model and linked to the entity profile, is trained to generate account identifiers from transaction records using a name embedding model and an adapter model. In one embodiment, the threshold is satisfied when the entity profile associated with the custom model is created less than a predetermined number of days prior to the present day (e.g., when the entity profile is less than 10 days old). In one embodiment, the adapter model includes multiple logistic regression models that are a one to one mapped to the account identifiers of the accounts of a chart of accounts for an entity profile.

At Step 284, a transaction vector is generated from the transaction record using the transaction model of the custom model. The transaction vector may be generated from features extracted from the transaction record and from a name embedding vector that is generated with a name embedding model from features extracted from the transaction record.

At Step 286, multiple adapter model outputs are generated from the transaction vector using an adapter model of the custom model. The adapter model outputs may correspond, one to one, to the account identifiers for the different accounts of a chart of accounts for an entity.

At Step 288, a baseline identifier is selected from the account identifiers using the adapter model outputs. In one embodiment, the adapter model output with the highest value may be used to identify the account, of the chart of accounts, that corresponds to the account identifier from the custom model to be used as the baseline identifier of the baseline model.

Figure 3A:
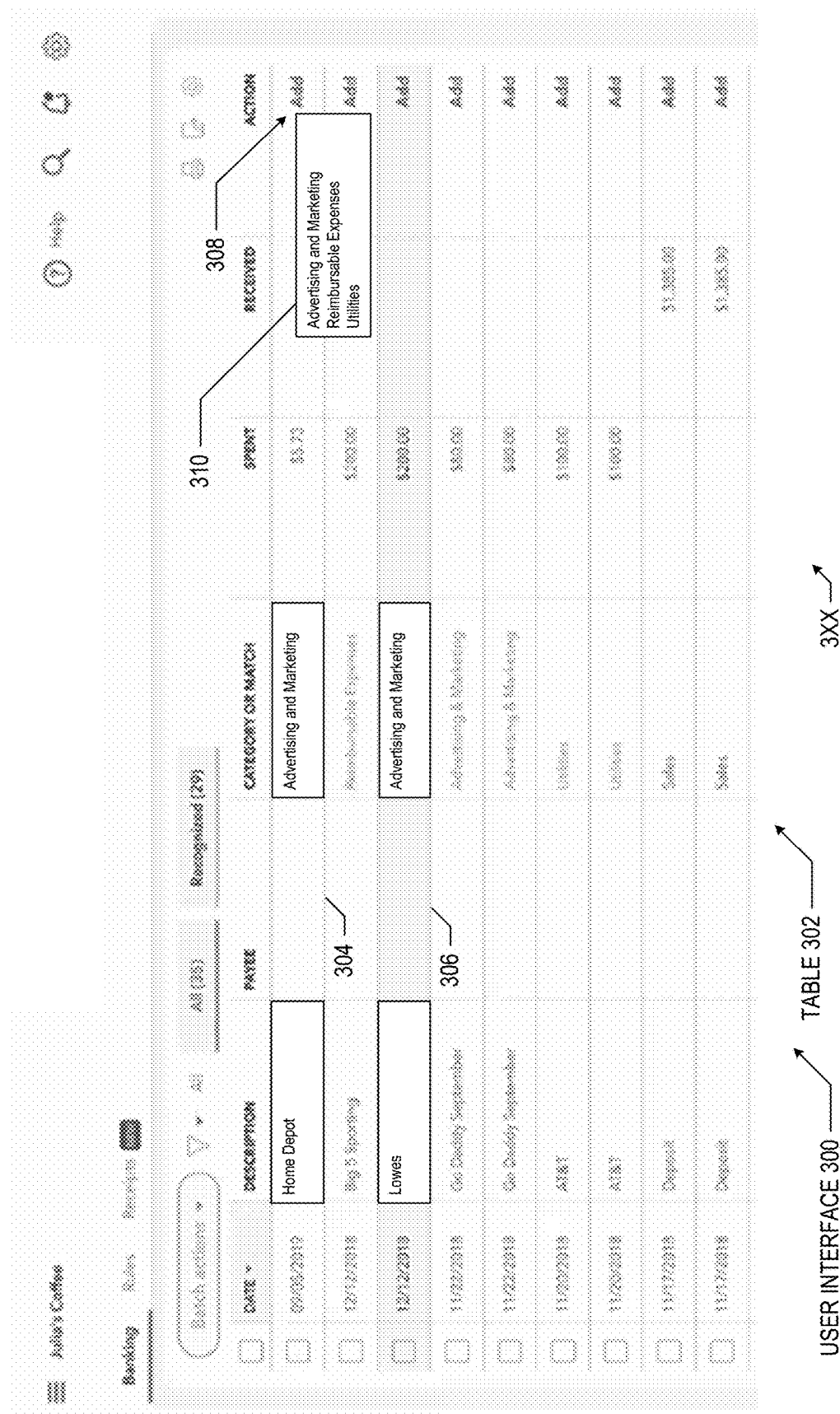
Figure 3B:
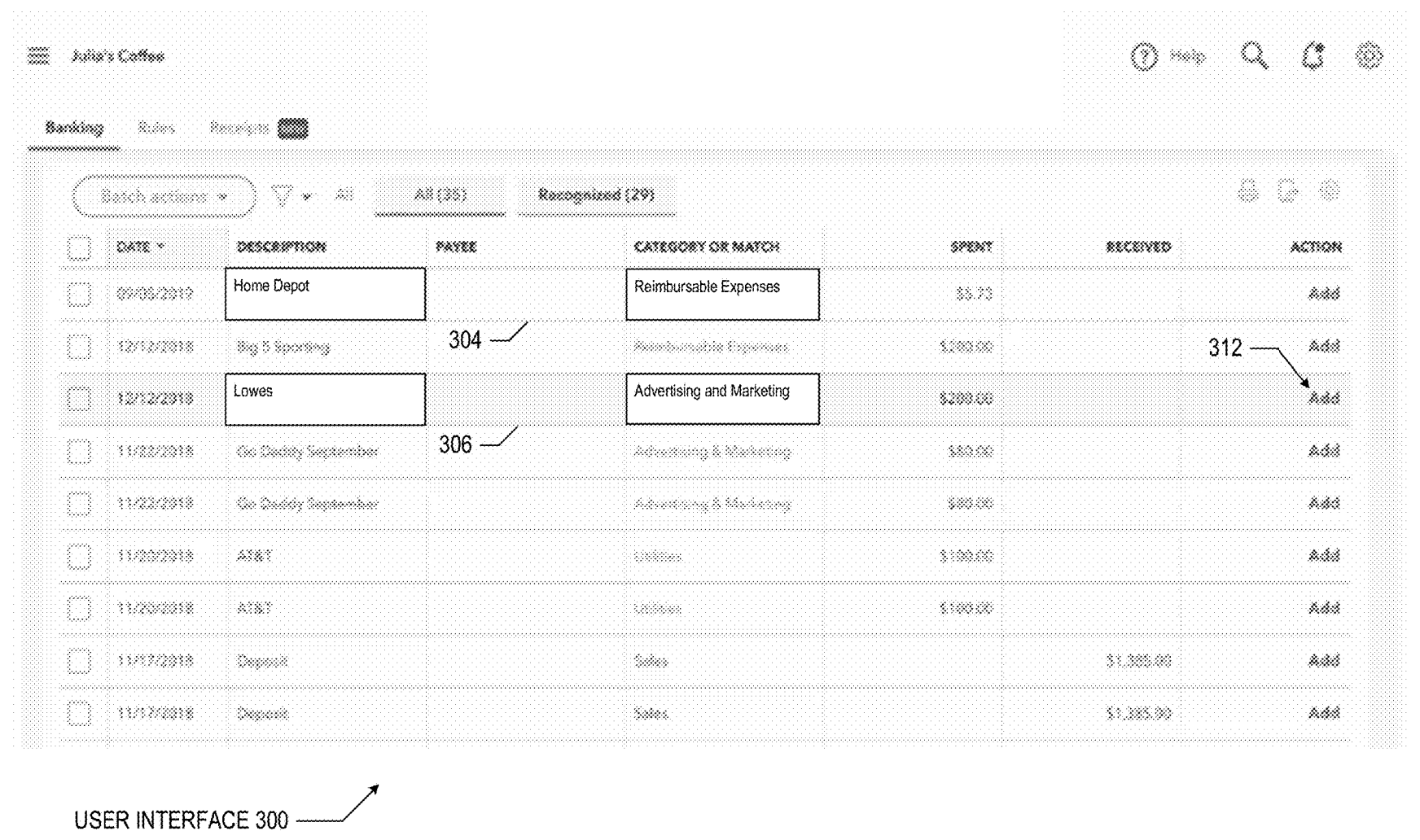
Figure 3C:
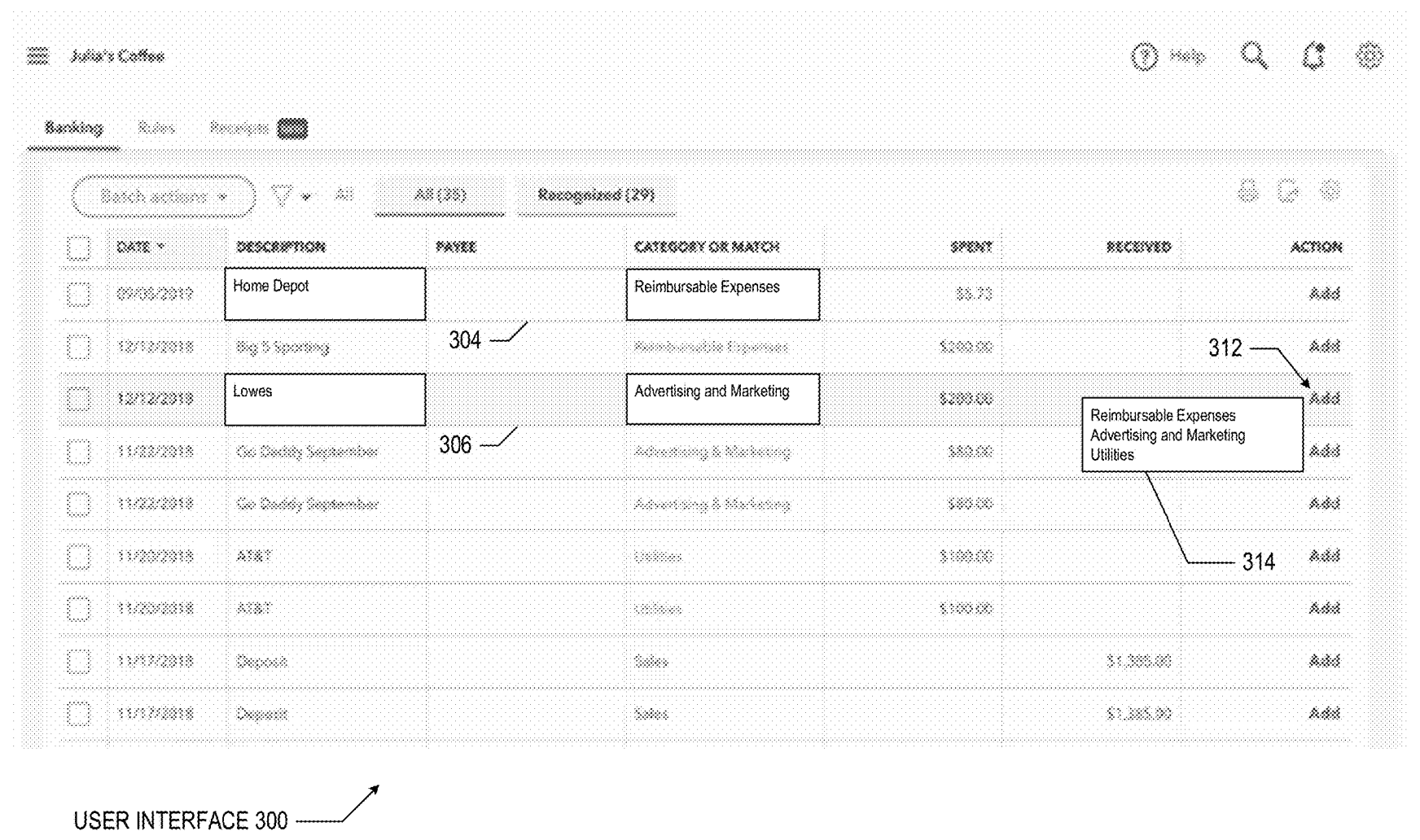
Figure 4A:
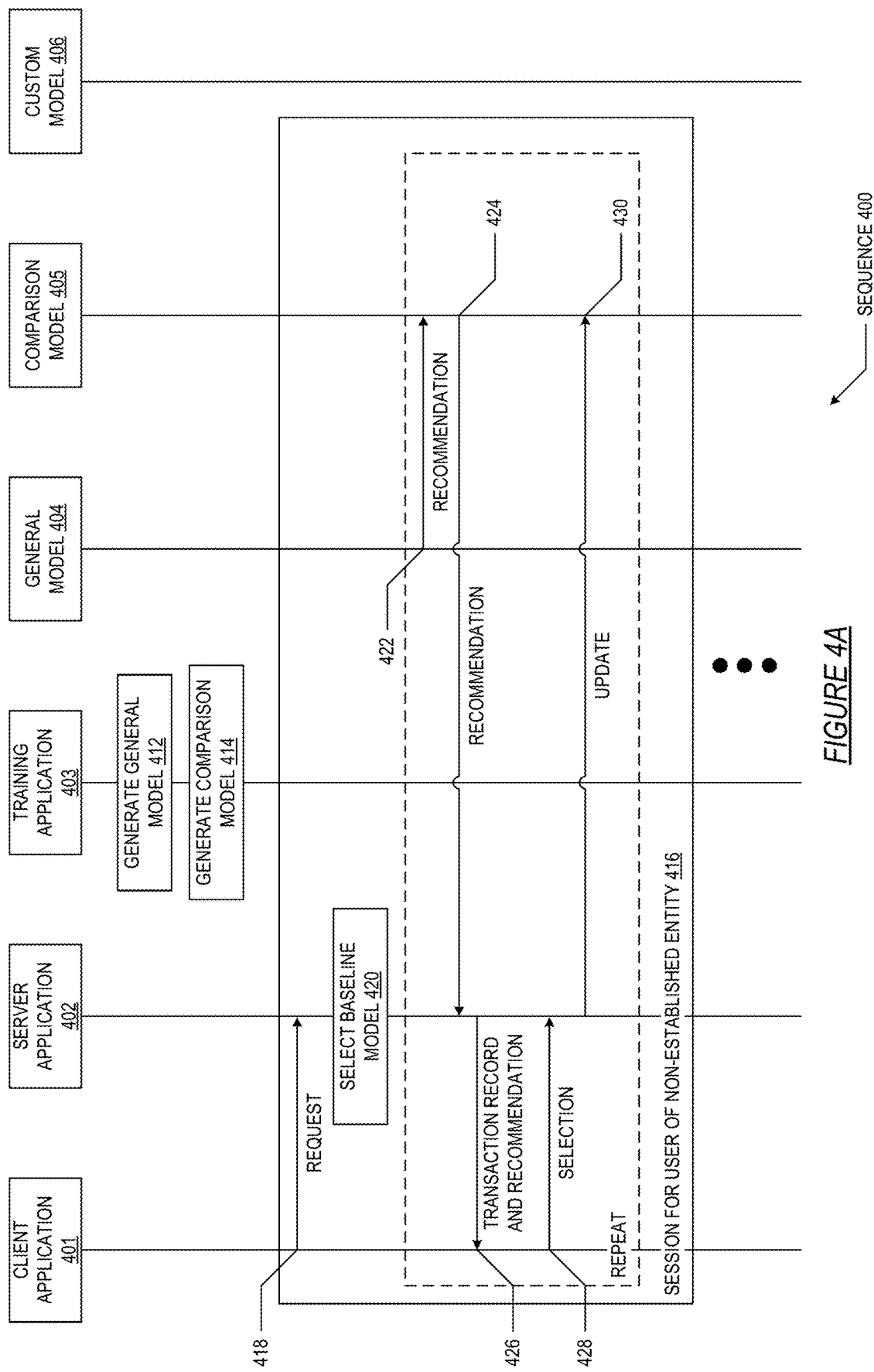
Figure 4B:
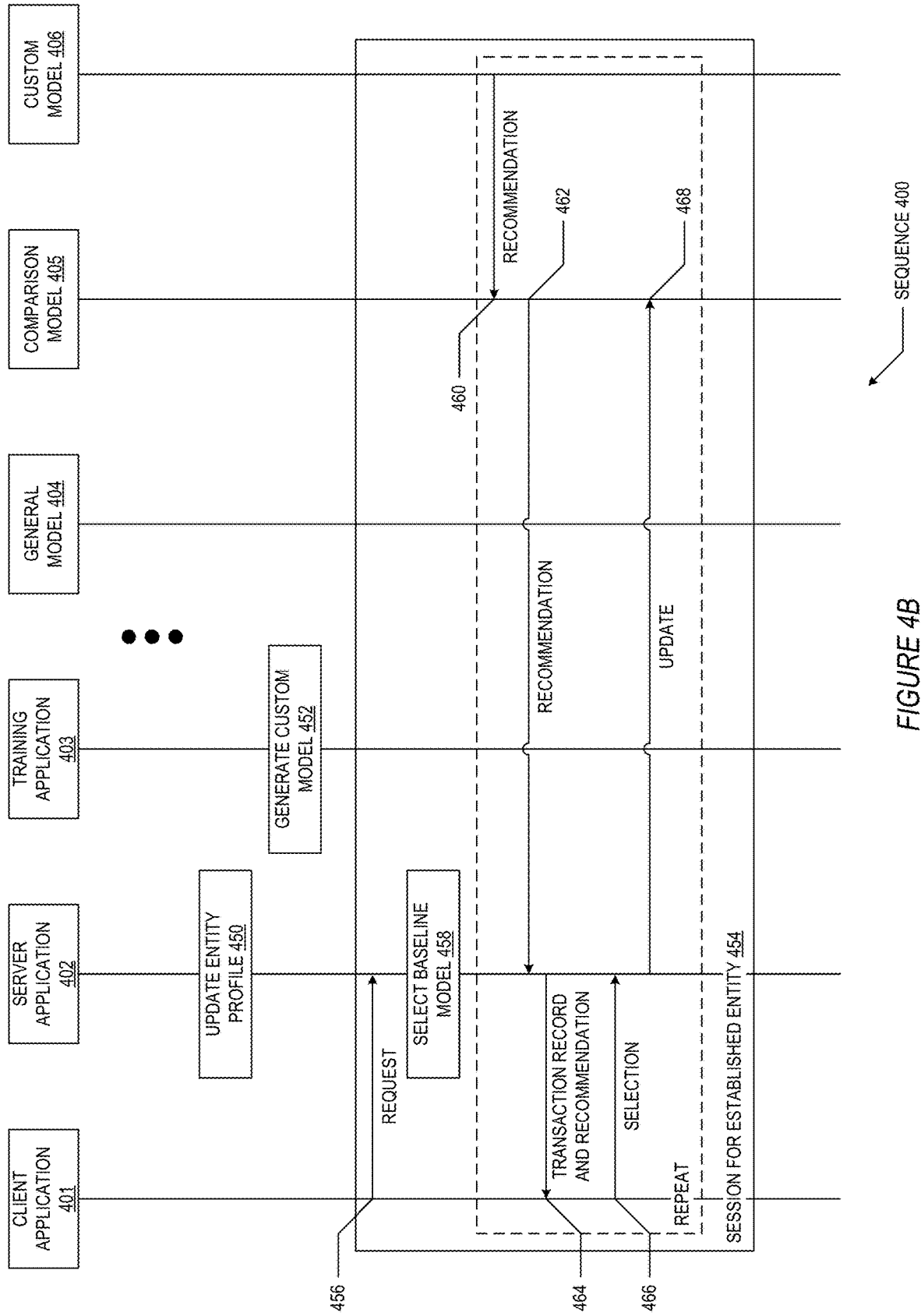

FIGS. 3A, 3B, 3C, 4A, and 4B show examples of systems and sequences that provide personalized account categorization for transactions. FIGS. 3A, 3B, and 3C show the entity interface (300) that displays transactions and suggested accounts for assignments to the transactions. FIGS. 4A and 4B show the sequence (400) that identifies and presents suggested accounts for assignment to transactions. The embodiments shown in FIGS. 3A, 3B, 3C, 4A, and 4B may be combined and may include or be included within the features and embodiments described in the other figures of the application. The features and elements of FIGS. 3A, 3B, 3C, 4A, and 4B are, individually and as a combination, improvements to the technology of computing systems and machine learning systems. The various features, elements, widgets, components, and interfaces shown in FIGS. 3A, 3B, 3C, 4A, and 4B may be omitted, repeated, combined, and/or altered as shown. Accordingly, the scope of the present disclosure should not be considered limited to the specific arrangements shown in FIGS. 3A, 3B, 3C, 4A, and 4B.

Turning to FIG. 3A, the entity interface (300) is displayed on a entity device. The entity interface (300) includes the table (302) with the rows (304) and (306). The table (302) includes a listing of transactions from a database of transaction records. The row (304) displays information from a first transaction record for a first transaction. The row (306) displays information from a second transaction record for a second transaction. The first and second transactions are initially assigned to the category (also referred to as an account) of "Advertising and Marketing".

The entity clicks on the button (308), which brings up the menu (310). The menu (310) includes a list of suggested accounts for the transaction of the row (304). In one embodiment, the items in the menu (310) are determined using the recommendation engine (118). For example the first item in the menu (310) may correspond to the account identifier D (162) (of FIG. 1A) selected using the machine learning models detailed in FIG. 1A from the transaction record for the row (304), which may correspond to the transaction record A (125).

The first item in the menu (310) may be the account that is determined to have the highest likelihood of being assigned to the transaction of the row (304), as determined by the baseline model. The entity clicks on the second item ("Reimbursable Expenses") of the menu (310) and the entity interface (300) is updated as shown in FIG. 3B.

Turning to FIG. 3B, the account for the transaction of the row (304) is updated to "Reimbursable Expenses." Additionally, the group of transaction records (for example, the transaction records B (150) of FIG. 1A) for the comparison model that are used to identify an account during a session is updated to include the transaction record of the row (304), which is matched to the "Reimbursable Expenses" account. By updating the group of transaction records, the comparison model is updated so that subsequent transactions that are identified as similar to the transaction of the row (304) may be suggested to be assigned to the "Reimbursable Expenses" account as determined by the comparison model instead of an account identified by the baseline model.

Entity may click on the button (312). Clicking on the button (312) may update the entity interface (300) to be as shown in FIG. 3C.

Turning to FIG. 3C, the menu (314) is displayed in response to clicking on the button (312). The items in the menu (314) are in a different order as compared to the items from the menu (310) (of FIG. 3A). The first item in the menu (314) is "Reimbursable Expenses" due to the update made to the group of transaction records for the comparison model. The payee name from the description for the transaction of the row (306) is different from the payee name from the description for the transaction of the row (304). However, the comparison model has identified the transactions of the row (306) and the row (304) to be similar enough to merit having the same account being assigned to the transaction of the row (306) as was assigned to the transaction of the row (304).

Turning to FIG. 4A, the sequence (400) is performed by the client application (401), the server application (402), the training application (403), the general model (404), the comparison model (405), and the custom model (406). The general model (404) and the custom model (406) may be selected as the baseline model that is used by a recommendation engine of the server application (402) in conjunction with the comparison model (405) to identify accounts that are suggested to be assigned to transactions.

At Step 412, a general model is generated. The components that make up the general model may be instantiated and then trained to generate an account identifier from a transaction. The general model may include a name embedding model, a transaction model, and a match model.

At Step 414, a comparison model is generated. The components that make up the comparison model may be instantiated and then trained to generate account identifiers from pairs of transactions. The comparison model may include a transaction model, which may include a name embedding model.

Steps (418) through (430) are part of the session (416), which is created when an entity accesses the system for an entity that is a non-established entity. The session is the interactive information interchange between the client application (401) and the server application (402). The entity profile that is being accessed by the entity is for an entity identified as a non-established entity. In one embodiment, a non-established entity has an entity profile that was created less than a threshold number of days (e.g., 10) prior to the start of the session (416), includes less than a threshold number of transactions, includes less than a threshold number of accounts, etc.

At Step 418 a request is sent from the client application (401) to the server application (402), which initiates the session (416). The request may be for a web page that provides a list of transactions, which allows the entity to assign accounts to transactions and provides suggestions for which account to assign to a transaction.

At Step 420, a baseline model is selected. The baseline model selected is the general model (404) since the entity, whose entity profile is being accessed, is a non-established entity.

At Step 422, the general model (404) generates and sends a recommendation to the comparison model (405). The recommendation includes the baseline identifier, which is the account identifier generated by the general model (404) from a transaction record.

At Step 424, the comparison model (405) generates and sends a recommendation (which may correspond to the account identifier D (162) of FIG. 1A) to the server application (402). The recommendation includes one of the baseline identifier from the general model (404) or the comparison identifier from the comparison model (405). In one embodiment, the comparison identifier from the comparison model (405) may be selected over the baseline identifier from the general model (404) when a comparison score for the comparison identifier satisfies a threshold. For example, the threshold may be a comparison score of greater than or equal to 0.8.

At Step 426, a transaction record with a recommendation is sent. The transaction record with the recommendation is sent from the server application (402) to the client application (401). The recommendation may identify one account or multiple accounts that may be assigned to the transaction.

At Step 428, the selection is sent. The selection is sent from the client application (401) to the server application (402). The selection identifies the account that is to be assigned to the transaction.

At Step 430, an update is sent. The update is sent from the server application (402) to the comparison model (405). The update may include the transaction record and the account identifier of the account selected by the entity. The transaction record and the account identifier pair may be added to the comparison model. By updating the comparison model, additional transactions with transaction records that are similar to the transaction record from the Step 426 may receive a recommendation that corresponds to the account selected by the entity at Step 428 during the session (416).

Steps 422 through 430 may be repeated for multiple transactions that are presented to and displayed by the client application (401). After the session (416) is torn down, the updates to the comparison model (405), received at Step 430, may be removed.

Turning to FIG. 4B, at Step 450, the entity profile is updated. The entity profile is updated from a non-established entity to being an established entity. For example, the entity profile may be updated when the entity profile was created more than a threshold number of days prior to the current day by the system, the number of transactions of the entity is greater than a threshold, the number of accounts in the chart of accounts of the entity is greater than a threshold, etc.

At Step 452, the custom model (406) is generated. Components that make up the custom model may be instantiated and then trained to generate an account identifier from a transaction. The custom model may include a name embedding model, a transaction model, and an adapter model. The adapter model may be customized to the specific entity to provide suggestions for the accounts of the specific entity, which may be different from one or more of the default accounts used by the system and the accounts of other entities that use the system.

Steps (456) through (468) are part of the session (454), which is created when a entity accesses the system for an established entity. The entity referred to in FIG. 4B may be the same as the entity from FIG. 4A but with an updated entity profile to indicate that the entity is now an established entity, as was done at Step 450.

At Step 456, a request is sent from the client application (401) to the server application (402), which initiates the session (454). The request may be for a webpage that provides a list of transactions, which allows the entity to assign accounts to transactions and provides suggestions for which account to assign to a transaction.

At Step 458, the baseline model is selected. The baseline model selected is the custom model (406) since the entity, whose entity profile is being accessed, is an established entity.

At Step 460, the custom model (406) generates and sends a recommendation to the comparison model (405). The recommendation includes the baseline identifier, which is the account identifier generated by the custom model (406) from a transaction record.

At Step 462, the comparison model (405) generates and sends a recommendation to the server application (402). The recommendation includes one of the baseline identifier from the custom model (406) or the comparison identifier from the comparison model (405). In one embodiment, the comparison identifier from the comparison model (405) may be selected over the baseline identifier from the custom model (406) when a comparison score for the comparison identifier satisfies a threshold. For example, the threshold may be a comparison score of greater than or equal to 0.7. The threshold may be different for different baseline models and may be customized for each entity profile.

At Step 464, a transaction record with a recommendation is sent. The transaction record with the recommendation is sent from the server application (402) to the client application (401). The recommendation may identify one account or multiple accounts that may be assigned to the transaction.

At Step 466, the selection is sent. The selection is sent from the client application (401) to the server application (402). The selection identifies the account that is to be assigned to the transaction.

At Step 468, an update is sent. The update is sent from the server application (402) to the comparison model (405). The update may include the transaction record and the account identifier of the account selected by the entity. The transaction record and the account identifier pair may be added to the comparison model. By updating the comparison model, additional transactions with transaction records that are similar to the transaction record from the Step 464, may receive a recommendation that corresponds to the account selected by the entity at Step 466 during the session (454).

Steps 456 through 468 may be repeated for multiple transactions that are presented to and displayed by the client application (401). After the session (454) is torn down, the updates to the comparison model (405), received at 468, may be removed.

Embodiments of the invention may be implemented on a computing system specifically designed to achieve an improved technological result. When implemented on a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a entity. For example, in one or more embodiments, a entity may submit data via a graphical entity interface (GUI) on the entity device. Data may be submitted via the graphical entity interface by a entity selecting one or more graphical entity interface widgets or inserting text and other data into graphical entity interface widgets using a touchpad, a keyboard, a mouse, or any other input device. In response to selecting a particular item, information regarding the particular item may be obtained from persistent or non-persistent storage by the computer processor. Upon selection of the item by the entity, the contents of the obtained data regarding the particular item may be displayed on the entity device in response to the entity's selection.

By way of another example, a request to obtain data regarding the particular item may be sent to a server operatively connected to the entity device through a network. For example, the entity may select a uniform resource locator (URL) link within a web client of the entity device, thereby initiating a Hypertext Transfer Protocol (HTTP) or other protocol request being sent to the network host associated with the URL. In response to the request, the server may extract the data regarding the particular selected item and send the data to the device that initiated the request. Once the entity device has received the data regarding the particular item, the contents of the received data regarding the particular item may be displayed on the entity device in response to the entity's selection. Further to the above example, the data received from the server after selecting the URL link may provide a web page in Hyper Text Markup Language (HTML) that may be rendered by the web client and displayed on the entity device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for entities to define, create, query, update, or administer databases.

The entity, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g., join, full join, count, average, etc.), sorts (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the entity or software application.

The computing system of FIG. 5A may include functionality to present raw and/or processed data, such as results of comparisons and other processing. For example, presenting data may be accomplished through various presenting methods. Specifically, data may be presented through a entity interface provided by a computing device. The entity interface may include a GUI that displays information on a display device, such as a computer monitor or a touchscreen on a handheld computer device. The GUI may include various GUI widgets that organize what data is shown as well as how data is presented to a entity. Furthermore, the GUI may present data directly to the entity, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a entity through haptic methods. For example, haptic methods may include vibrations or other physical signals generated by the computing system. For example, data may be presented to a entity using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving a first transaction record corresponding to an entity profile;
   selecting, responsive to an entity profile failing to satisfy a usage threshold, a general model as a baseline model from a plurality of machine learning models, wherein:
     the general model comprises:
       a first transaction model that generates a first transaction vector,
       a match model that generates a match score between the first transaction vector and a respective account vector, and
       a first account selector that selects a first baseline identifier using the match score, and
     the plurality of machine learning models comprises the general model and a custom model;
   processing, by the baseline model, the first transaction record to select a first account identifier using the first baseline identifier, wherein the processing comprises:
     generating, by the first transaction model, the first transaction vector from the first transaction record, the first transaction vector in a same vector space as a plurality of account vectors,
     wherein each of the plurality of account vectors are generated for a respective account of a first plurality of accounts,
     generating, by the match model, a corresponding match score between the first transaction vector and each of at least two of the plurality of account vectors to generate a plurality of match scores, and
     selecting, by the first account selector using the plurality of match scores, the first baseline identifier for a corresponding account of the first plurality of accounts;
   presenting the first account identifier for the first transaction record;
   receiving, subsequent to the first transaction record, a second transaction record corresponding to the entity profile;
   selecting, responsive to the entity profile satisfying the usage threshold, the custom model as the baseline model from the plurality of machine learning models;
   processing, by the baseline model, the second transaction record to select a second account identifier using a second baseline identifier, wherein the processing comprises:
     generating, by a second transaction model, a second transaction vector from the second transaction record,
     generating, by an adapter model, an adapter model output using the second transaction vector,
       wherein the adapter model is customized to a customized chart of accounts of an entity corresponding to the entity profile, and wherein the adapter model output comprises a value for each custom account of at least two custom accounts in the customized chart of accounts, the value indicating whether the corresponding custom account is a category for the second transaction record, and
     selecting, by a second account selector, the second baseline identifier according to the adapter model output; and
   presenting the second account identifier for the second transaction record.

2. The method of claim 1, wherein selecting the account identifier further comprises:
   receiving the baseline identifier from the baseline model;
   generating a comparison identifier from the first transaction record using a comparison model of a recommendation engine; and
   selecting one of the baseline identifier and the comparison identifier as the account identifier.

3. The method of claim 1, further comprising:
   training a comparison model to generate a comparison score from a pair of transaction records using a transaction model from the general model.

4. The method of claim 1, wherein selecting the baseline model further comprises:
   selecting the baseline model using information from an entity profile.

5. The method of claim 1, further comprising:
   training the general model to generate account identifiers from transaction records.

6. The method of claim 1, wherein, when the general model is executed, processing the baseline model comprises:
   generating a name embedding vector from the first transaction record using the name embedding model of the general model;

generating the first transaction vector from the name embedding vector and the first transaction record using the first transaction model of the general model;
generating the match score from the transaction vector and the respective account vector using the match model; and
selecting the baseline identifier using the match score.

7. The method of claim 1, further comprising:
in response to satisfaction of the usage threshold by an entity profile, training the custom model, used as the baseline model and linked to the entity profile, to generate account identifiers from transaction records using a name embedding model and the adapter model.

8. The method of claim 1, wherein the adapter model comprises a plurality of regression models, wherein each custom account in the customized chart of accounts is related to an distinct corresponding regression model of the plurality of regression models, and wherein generating the adapter model output comprises:
executing the plurality of regression models with the transaction vector as input to obtain the value for the at least two custom accounts in the customized chart of accounts.

9. A system comprising:
a server comprising one or more processors and one or more memories; and
a server application, executing on the one or more processors of the server, configured for:
receiving a first transaction record corresponding to an entity profile;
selecting, responsive to an entity profile failing to satisfy a usage threshold, a general model as a baseline model from a plurality of machine learning models, wherein:
the general model comprises:
a first transaction model that generates a first transaction vector,
a match model that generates a match score between the first transaction vector and a respective account vector, and
a first account selector that selects a first baseline identifier using the match score, and
the plurality of machine learning models comprises the general model and a custom model;
processing, by the baseline model, the first transaction record to select a first account identifier using the first baseline identifier, wherein the processing comprises:
generating, by the first transaction model, the first transaction vector from the first transaction record, the first transaction vector in a same vector space as a plurality of account vectors,
wherein each of the plurality of account vectors are generated for a respective account of a first plurality of accounts,
generating, by the match model, a corresponding match score between the first transaction vector and each of at least two of the plurality of account vectors to generate a plurality of match scores, and
selecting, by the first account selector using the plurality of match scores, the first baseline identifier for a corresponding account of the first plurality of accounts; and
presenting the first account identifier for the first transaction record;
receiving, subsequent to the first transaction record, a second transaction record corresponding to the entity profile;
selecting, responsive to the entity profile satisfying the usage threshold, the custom model as the baseline model from the plurality of machine learning models;
processing, by the baseline model, the second transaction record to select a second account identifier using a second baseline identifier, wherein the processing comprises:
generating, by a second transaction model, a second transaction vector from the second transaction record,
generating, by an adapter model, an adapter model output using the second transaction vector,
wherein the adapter model is customized to a customized chart of accounts of an entity corresponding to the entity profile, and
wherein the adapter model output comprises a value for each custom account of at least two custom accounts in the customized chart of accounts, the value indicating whether the corresponding custom account is a category for the second transaction record, and
selecting, by a second account selector, the second baseline identifier according to the adapter model output; and
presenting the second account identifier for the second transaction record.

10. The system of claim 9, wherein selecting the account identifier further comprises:
receiving the baseline identifier from the baseline model;
generating a comparison identifier from the first transaction record using a comparison model of a recommendation engine; and
selecting one of the baseline identifier and the comparison identifier as the account identifier.

11. The system of claim 9, wherein the server application is further configured for:
training a comparison model to generate a comparison score from a pair of transaction records using a transaction model from the general model.

12. The system of claim 9, wherein the server application is further configured for:
training the general model to generate account identifiers from transaction records.

13. The system of claim 12, wherein, when the general model is executed, processing the baseline model comprises:
generating a name embedding vector from the first transaction record using the name embedding model of the general model;
generating the first transaction vector from the name embedding vector and the first transaction record using the first transaction model of the general model;
generating the match score from the transaction vector and the respective account vector using the match model; and
selecting the baseline identifier using the match score.

14. The system of claim 9, wherein the server application is further configured for:
in response to satisfaction of a threshold by an entity profile, training a custom model, used as the baseline model and linked to the entity profile, to generate account identifiers from transaction records using a name embedding model and an adapter model.

* * * * *